Figure 1:
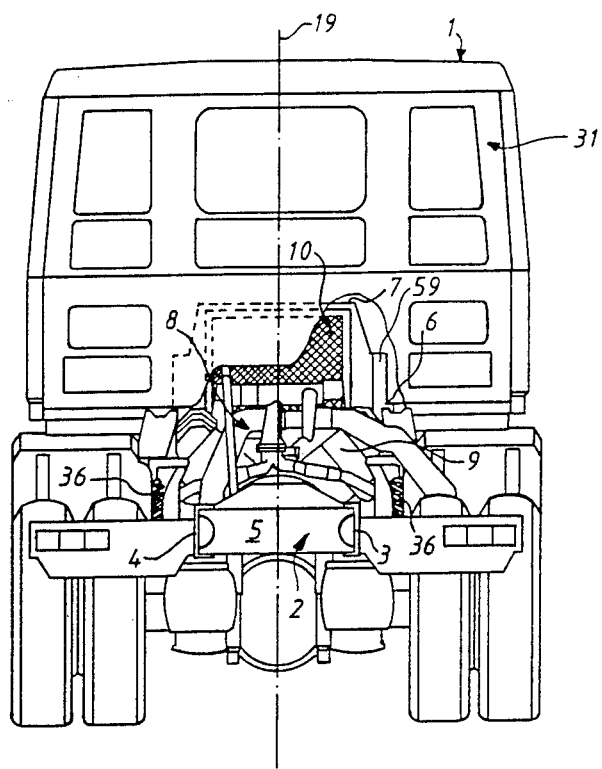

United States Patent [19]

Sjöström et al.

[11] Patent Number: 4,735,272
[45] Date of Patent: Apr. 5, 1988

[54] ARRANGEMENT FOR SUSPENDING A FORWARDLY TIPPABLE CAB ON A VEHICLE

[75] Inventors: Staffan S. Sjöström, Grödinge; Hilding Nilsson, Nykvarn, both of Sweden

[73] Assignee: Saab Acania Aktiebolag, Sodertalje, Sweden

[21] Appl. No.: 894,114

[22] Filed: Aug. 7, 1986

[30] Foreign Application Priority Data

Aug. 21, 1985 [SE] Sweden ................................ 8503890

[51] Int. Cl.⁴ ............................................ B62D 33/06
[52] U.S. Cl. .................................. 180/89.14; 296/190
[58] Field of Search ............... 180/89.14, 89.17, 89.18, 180/89.19, 69.21, 69.20; 296/190

[56] References Cited

U.S. PATENT DOCUMENTS

| 3,005,511 | 10/1961 | Riedy | 180/89.14 |
| 3,944,017 | 3/1976 | Foster | 296/190 |
| 4,452,328 | 6/1984 | Oudelaar | 180/89.14 |
| 4,452,329 | 6/1984 | Stone | 296/190 |

FOREIGN PATENT DOCUMENTS

| 2161952 | 6/1973 | Fed. Rep. of Germany | 296/190 |
| 2161953 | 6/1973 | Fed. Rep. of Germany | |
| 155169 | 9/1982 | Japan | 296/190 |
| 1399611 | 7/1975 | United Kingdom | |
| 1419796 | 12/1975 | United Kingdom | |

Primary Examiner—John J. Love
Assistant Examiner—Karin L. Ferriter
Attorney, Agent, or Firm—Cushman, Darby & Cushman

[57] ABSTRACT

The invention relates to an arrangement for the suspension of a forwardly tippable cab on a vehicle frame with at least one spring means and one movement restrainer arranged between the cab and the frame, said spring means being adapted to absorb the oscillations of the cab and the restrainer being adapted for restricting the vertical movement of the cab relative the frame.

When tipping the cab on the kind of vehicle mentioned above, the center of gravity of the cab is moved, whereby the weight of the cab is successively transferred to the spring means. The latter then contracts and the necessary play between the vehicle drive unit and lower portions of the cab necessary for tipping the cab decreases, resulting in that the cab can collide with the drive unit.

The invention has the object of counteracting the cab sinking during the tipping sequence, and the invention is distinguished in that both the spring means and the movement restrainer each has a support mounting in the carrying parts of the cab and that the support mounting of the movement restrainer is arranged forward of the support mounting of the spring means.

10 Claims, 2 Drawing Sheets

ARRANGEMENT FOR SUSPENDING A FORWARDLY TIPPABLE CAB ON A VEHICLE

The present invention relates to an arrangement for the suspension of a forwardly tippable driver's cabin or cab at the forward part of a longitudinal vehicle frame, there being arranged between the cab and the frame at least one spring means and a movement restrainer, the spring means being adapted to absorb the oscillations of the cab and the restrainer being adapted to limit the vertical movements of the cab relative the vehicle frame.

In so-called cab-over-engine vehicles, e.g. trucks, the cab is placed above the vehicle drive unit. The internal combustion engine and its radiator included in the drive unit are here fixedly mounted on the vehicle frame, there being an engine screen formed on the underside of the cab to cover the engine and radiator. To make the drive unit easily accessible for inspection and possible repairs, the cab is generally tippable relative the vehicle frame.

To facilitate entry into, and exit out of cab-over-engine cabs it is usual to form the cab so that its floor is at a level closer to the frame than remaining parts of the engine screen. This results in that an engine screen covering the engine and radiator project up into the cab and restrict the space therein.

With the majority of tippable cab-over-engine cabs the engine screen projecting into the cab is greater than what is required for it solely to cover the engine and cooler when the cab is in its normal position. This is regarded as necessary to obtain sufficient play between the radiator and engine screen when the cab is tipped.

In vehicles of the kind mentioned above it is usual to arrange the forward part of the cab with sprung suspensions relative the frame. In such a case the suspension may include helical springs in combinatioan with shock absorbers, the shock absorbers functioning as restrainers by their stroke limiting the vertical movements of the cab relative the frame. A cab suspended in such a manner causes problems when the cab is tipped, however. During the tipping movement the center of gravity of the cab is namely moved forward, thus transferring more and more of the cab weight to the forward cab springing. This results in that the springs are compressed so that the shock absorbers "bottom", i.e. they become fully compressed. The necessary play between the radiator and engine screen required for tipping the cab is thus reduced, and there is risk of the screen colliding with the vehicle radiator during the tipping process. It is usual to increase the play between the screen and radiator by lowering the radiator so that its lower part assumes a position between the forward transverse beam of the vehicle frame and its shock absorbers. A radiator arranged in this way gives a limited cooling effect, however, since the lower part of the radiator is not subjected to the air flow occurring during travel with the vehicle.

Increasing this play by making a larger engine screen in the cab floor also results in disadvantages, since such a measure further reduces the space in the cab.

The present invention has the object of eliminating the above-mentioned problem and enabling the utilization of a larger radiator within the space provided by a given engine screen than what is the case when utilizing a conventional forward cab suspension. With this object the invention is distinguished in that both the spring means and the movement restrainer each have a support mounting on carrying portions of the cab and that the support mounting of the movement restrainer is arranged forward of the suport mounting of the spring means.

The inventive arrangement counteracts sinking of the cab during the tipping operatioan, which gives greater space within which the radiator may be arranged for enabling effective cooling of the engine. In addition, there is achieved good lateral guidance of the cab when it is in a tipped position, since the above-mentioned arrangement also functions as a stabilizer.

Other distinguishing features of the invention will be apparent from the following claims and description of an embodiment exemplifying the invention. The description is carried out here with reference to the accompanying drawings, on which the same reference numerals in the different figures refer to mutually corresponding parts.

Figure 2:
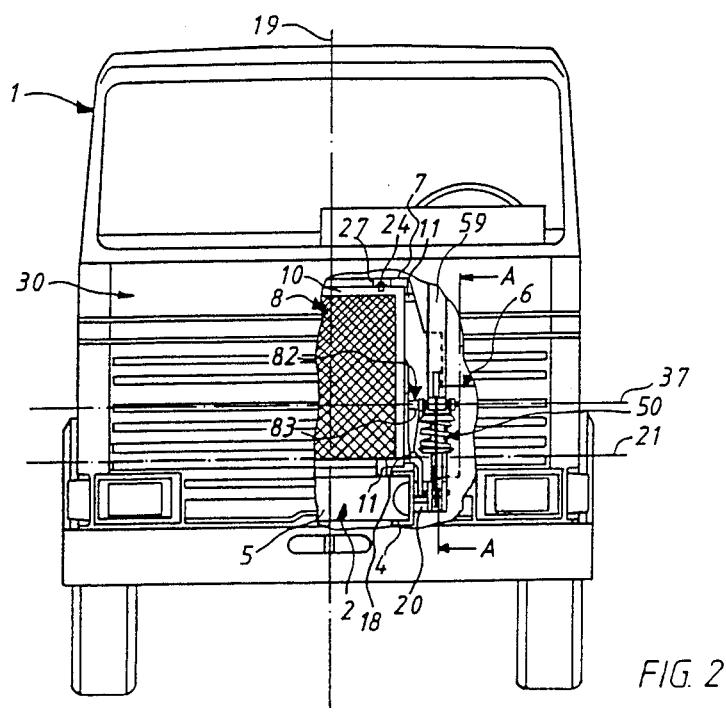
Figure 3:
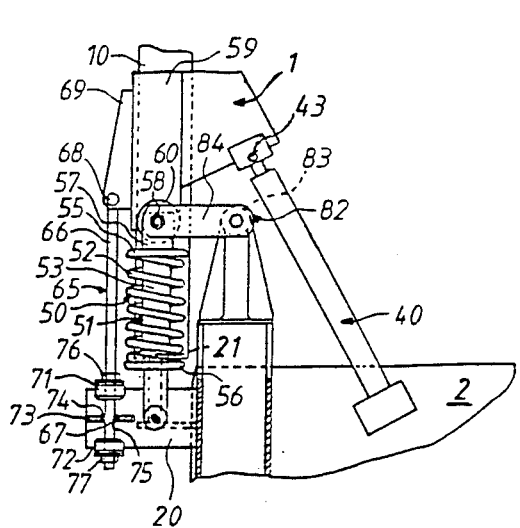
Figure 4:
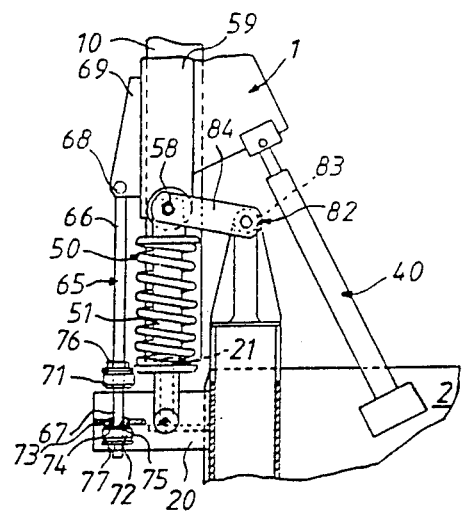
Figure 5:
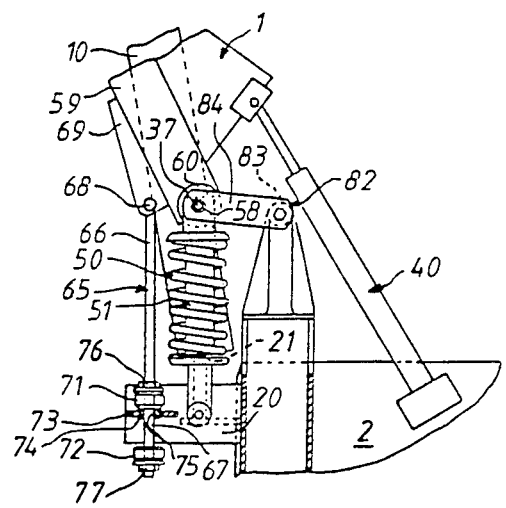

FIG. 1 is a rear view of a truck equippped with an inventive arrangement for a tippable cab, FIG. 2 is a front view of the truck in FIG. 1, FIG. 3 is a side view, substantially according to section A—A in FIG. 2, of the inventive springing arrangement with the cab assuming its normal position, FIG. 4 is a side view, substantially according to a section A—A in FIG. 2, of the inventive springing arrangement during the initial state of a tipping operation, and FIG. 5 is a side view, substantially according to section A—A in FIG. 3, of the inventive springing arangement when the cab has assumed a tipped position.

A tippable cab 1 is arranged on the truck illustrated in FIGS. 1 and 2. The cab 1 is suspended on a frame 2, which mainly includes two longitudinal, parallel stringer beams 3,4. These are mutually united with the aid of a plurality of transverse beams 5. A drive unit 8 is conventionally mounted on the truck frame 2, and included in the unit there is a internal combustion engine 9 and a radiator 10, the latter being part of the cooling system of the engine 9. The radiator 10 is arranged forward of the engine 9 for conventionally taking coolant to and from the engine 9 via hoses 11. In its normal position the cab 1 is situated above the drive unit 8 of the vehicle, and the underside 6 of the cab 1 is formed as an engine screen 7 with respect hereto. The drive unit 8 will be easily accessible when the cab 1 is tipped.

FIG. 2 illustrates one half of the symmetrically arranged radiator 10, and from the figure it will also be seen that the lower part of the radiator 10 is pivotably mounted relative the frame 2 about an axis 21. The respective mounting 18 is arranged on a bracket 20 fixed to the frame on either side of an imaginary plane of symmetry 19 through the truck. The upper part of the radiator 10 includes a roller 24 arranged on either side of the plane 19, said roller being compulsorily guided by a rolling surface 27 arranged on either side of the plane 19 and fixed to the cab, the compulsory guidance being described in more detail below.

The cab 1 illustrated in FIGS. 1 and 2 has sprung suspension on the frame 2 at its front part 30 and its rear part 31. The forward cab suspension comprises a spring means 50 arranged on either side of the symmetry plane 19 and is described in more detail below. A cab suspension 36, known per se, is utilized for the rear suspension, and since it is not a part of the present invention it will not be described further.

The cab 1 is tipped with the aid of a hydraulically operated piston-cylinder, ram means 40 known per se. At one end the ram means 40 is attached to the frame 2 and at its other end it is attached to the cab 1 in a position between the spring means 50 and the centre of gravity of the cab 1.

FIG. 2 illustrates one half of the symmetrically constructed vehicle front and also illustrates that the cab 1 has sprung suspension in the vicinity of its front part 30 provided by a spring means 50 arranged on either side of the symmetry plane 19. The spring means includes a spring leg 51 essentially comprising a helical compression spring 52, which co-acts with a shock absorber 53 via an upper and a lower spring seating 55,56. The upper side of the upper spring seating 55 is on either side of the symmetry plane 19 attached to a U-shaped member 57, which with the aid of a bolt 58 is pivotably arranged in a support mounting 60 on a support leg 59 arranged on either side of the symmetry plane 19. The support leg 59 is included in the carrying parts of the cab 1. The lower part of the respective spring leg 51 is pivotably mounted relative a bracket 20 located at the respective spring leg and fixed to the frame.

It will be seen from the side views of FIGS. 3-5 that forward of the line of action of the respective spring leg 51 there is arranged a movement restrainer 65 in the shape of a vertical rod 66. The lower part of the rod 66 has a thread 67 and its upper part is pivotably mounted in a support mounting 68, arranged in a bracket 69 fixed to the respective support leg 59. The rod 66 is adapted to pass through a hole 75 provided with a rubber bush 74 in a plate 73 fixed to the bracket 20. Two abutment means 71,72 attached in mutual spacing to the threaded portion 67 of the rod 66, comprise members having shock absorbing ability. The means 71,72 co-act with the plate 73, one on either side thereof. The respective movement restrainer 65 is displaced longitudinally during travel and when tipping the cab. The displacing movement is restrained by the abutment means 71,72. The abutment means 71,72 are adjustably positioned along the threaded portion 67 of the rod 66 with the aid of adjusting nuts 76,77.

As will be seen from FIGS. 2-5 the spring means 50 co-acts with a stabilizing member 82, which essentially includes a torsion bar 83 having at each end a U-shaped fastening 84. The stabilizing member 82 is arranged transversely on the truck for dampening different spring movements of the spring leg 51 in a manner known per se. Each fastening 84 is pivotably mounted about the bolt 58 at the respective support leg 59, while the torsion bar 83 is pivotably mounted on the bracket 20 fixed to the frame on either side of the symmetry plane 19.

The arrangement in the inventive solution has the following function.

Since the spring means 50 and the radiator 10 of the drive unit 8 are symmetrically arranged about the symmetry plane 19, only the functional sequence for the arrangement on one side of the symmetry plane 19 will be described, it is being understood that the corresponding sequence occurs on the other side of the symmetry plane as well.

The tipping sequence is started by the ram means 40 being activated. Due to the point of action 43 of the ram means 40 on the cab 1 being situated forward of the cab centre of gravity, the support leg 59 is raised, and thereby the front part 30 of the cab, during the initial stage of the tipping sequence. The rolling surface 27 fastened to the cab (illustrated in FIG. 2) is then displaced upwards relative the roller 24 of the radiator 10 which is fastened to the frame.

When the cab 1 is raised, the spring leg 51 extends simulataneously as the movement restrainer 65 is displaced longitudinally upwards through the rubber bushing 74 in the fixed plate 73. The extension and displacement movement stop when the lower abutment means 72 comes into engagement against the underside of the plate 73.

Due to the stabilizer 82 co-acting with the spring leg 51 its U-shaped attachment 84 pivots upwards during the initial stage and assumes a position corresponding to the position of the lower abutment means 72 along the thread 67 of the vertical rod 66.

When the cab 1 has reached its upper position, the tipping movement begins and the cab is tipped about an imaginary horizontal axis 37 transverse the truck 1, through the support mounting 60 of the spring leg 51. The centre of gravity of the cab is moved forwards during the tipping movement, and the weight of the cab is successively transferred to the spring leg 51. This tends to be compressed simultaneously as the movement restrainer 65 is turned on its support mounting 68 and is displaced longitudinally downwards through the rubber bushing 74 in the plate 73.

It will be seen from FIG. 5 that the tendency to compress the spring leg ceases when the upper abutment means 71 reaches engagement against the upper side of the plate 73. The position of the upper abutment means 71 along the rod 66 of the movement restrainer 65 is selected such that the contraction of the spring leg 51 is substantially non-existent during the entire tipping sequence.

When the upper abutment means 71 reaches engagement against the plate 73, the cab 1 is forced by the ram means 40 to tip about an imagined, horizontal axis transverse the truck 1 through the support mounting 68 of the movement restrainer 65. This gives rise to an upwardly directed torque about the support mounting 60 of the spring leg 51, resulting in that the spring leg 51 extends. The distance between the support mounting 60 of the spring leg 51 and the support mounting 68 of the movement restrainer 65 is selected such that the spring leg 51 is substantially in its upper spring position when the cab 1 is in its maximum tipped position.

During the tipping movement, the plate 27 fixed to the cab compulsorily guides the roller 24 and thereby the radiator 10 so that the latter is turned about its tipping axis 21.

When the tipped cab is lowered to its normal position the sequence described above occurs in reverse order.

The movement restrainer 65 is also activated during travel, it then being displaced upwards or downwards through the rubber bushing 74 in the plate 73 in response to the oscillations of the cab 1. During travel on a normal substructure, the oscillations of the cab 1 are dampened by the shock absorber 53. On the other hand, if the substructure is extremely irregular terrain, the oscillations are dampened by the shock absorber 53 in combination with the upper or lower abutment means 71,72 coming into contact with the plate 73.

The movement restrainer can be implemented in other ways within the scope of the present inventiond than what has been shown in the embodiment example. For example, the restrainer can be integrated with a shock absorber, which is then arranged in the inventive manner. Furthermore, the spring leg may be replaced by other types of spring, e.g. pneumatic springs. Other modifications are also possible without the inventive concept being lost.

We claim:

1. Arrangement for the suspension of a forwardly tippable driver's cabin or cab at the forward part of a longitudinal vehicle frame, there being between the cab and the frame at least one spring means and a movement restrainer, the spring means being adapted to absorb the oscillations of the cab and the restainer being adapted to limit the vertical movements of the cab relative to the vehicle frame, characterized in that both the spring means and the movement restrainer each have a support for pivotal mounting on carrying portions of the cab, that the support for pivotal mounting of the movement restrainer is arranged forward of the support for pivotal mounting of the spring means and that the support for pivotal mounting of the spring means constitutes the tipping axis of the cab during the initial stage of a tipping sequence, while the support for pivotal mounting of the movement restrainer constitutes the tipping axis of the cab during the remaining part of the tipping sequence.

2. Arrangement as claimed in claim 1, characterized in that the distance between the support for pivotal mounting of the spring means and the support for pivotal mounting of the movement restrainer is selected such that the spring means is substantially in its upper sprung position when the cab is in its maximum tipped position.

3. Arrangement as claimed in claim 1, characterized in that the movement restrainer includes a rod with two abutment means.

4. Arrangement as claimed in claim 3, characterized in that during a tipping sequence the abutment means comes into engagement against a part fixed to the frame, said part being fixed substantially vertically under the support for pivotal mounting of the movement restrainer.

5. Arrangement as claimed in claim 3, characterized in that at least one of the abutment means is arranged along the rod so that contraction of the spring means is substantially nonexistent during the tipping sequence.

6. Arrangement as claimed in claim 3, characterized in that the abutment means comprise members having a shock-absorbing capacity.

7. Arrangement as claimed in claim 3, characterized in that the abutment means are adjustably arranged along the rod.

8. Arrangement as claimed in claim 7, characterized in that the spring means comprises a spring leg including a shock abosrber separate from the movement restrainer.

9. Arrangement as claimed in claim 1, characterized in that at least one movement restrainer is arranged on either side of the longitudinal plane of symmetry of the vehicle.

10. Arrangement for the suspension of a forwardly tippable driver's cabin or cab or the like at the forward part of a longitudinal vehicle frame, there being between the cab and the frame at least one spring means and a movement restrainer which includes a rod with two abutment means adjustably arranged along the rod, the spring means being adapted to absorb the oscillations of the cab and the restrainer being adapted to limit the vertical movements of the cab relative the vehicle frame, characterized in that both the spring means and the movement restrainer each have a support for pivotal mounting on carrying portions of the cab, that the support for pivotal mounting of the movement restrainer is arranged forward of the support for pivotal mounting of the spring means, and that during a tipping sequence the abutment means comes into engagement against a part fixed to the frame, said part being fixed substantially vertically under the support for pivotal mounting of the movement restainer.

* * * * *